United States Patent
Nakashin (10) Patent No.: US 11,016,629 B2
(45) Date of Patent: May 25, 2021

(54) DISPLAY DEVICE, METHOD FOR CONTROLLING DISPLAY DEVICE, AND DISPLAY SYSTEM

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/662,176

(22) Filed: Oct. 24, 2019

(65) Prior Publication Data
US 2020/0133440 A1   Apr. 30, 2020

(30) Foreign Application Priority Data

Oct. 25, 2018   (JP) .............................. JP2018-201176

(51) Int. Cl.
| | | |
|---|---|---|
| *G06F 3/0481* | (2013.01) | |
| *G06F 3/042* | (2006.01) | |
| *G06F 3/0354* | (2013.01) | |
| *G06T 11/80* | (2006.01) | |

(52) U.S. Cl.
CPC ........ *G06F 3/0481* (2013.01); *G06F 3/03545* (2013.01); *G06F 3/042* (2013.01); *G06T 11/80* (2013.01)

(58) Field of Classification Search
CPC .... G06F 3/0481; G06F 3/042; G06F 3/03545; G06F 3/03542; G06F 3/04847; G06F 3/04886; G06F 3/04883; G06F 3/0482; G06T 11/80; G06T 11/60

USPC ......................................................... 345/619
See application file for complete search history.

(56) References Cited

U.S. PATENT DOCUMENTS

| | | | | |
|---|---|---|---|---|
| 2002/0054172 | A1* | 5/2002 | Berman | G06F 3/04845 715/856 |
| 2003/0090493 | A1* | 5/2003 | Masuda | G06F 3/0481 345/581 |
| 2013/0321307 | A1* | 12/2013 | Obana | G06F 3/03545 345/173 |
| 2014/0049555 | A1* | 2/2014 | Bzdusek | G06T 7/0014 345/589 |
| 2014/0285475 | A1* | 9/2014 | Ogata | G01B 11/26 345/175 |

FOREIGN PATENT DOCUMENTS

| | | |
|---|---|---|
| JP | 2003-123087 A | 4/2003 |
| JP | 2013-246750 A | 12/2013 |
| JP | 2017-157135 A | 9/2017 |

\* cited by examiner

*Primary Examiner* — Jennifer Mehmood
*Assistant Examiner* — Kim Thanh T Tran
(74) *Attorney, Agent, or Firm* — Oliff PLC (57) ABSTRACT

A display device includes: a display unit displaying an image on a display surface; a detection unit detecting a position on the display surface pointed by a pointing unit; and a control unit causing the display unit to display an image based on the position detected by the detection unit. The control unit causes the display unit to display a first image and a second image having a different setting of a first attribute and a second attribute from the first image. The control unit decides a setting of the first attribute and the second attribute used for the image based on the position detected by the detection unit, according to an operation on the first image or the second image.

12 Claims, 5 Drawing Sheets

| | TYPE(1) | TYPE(2) | TYPE(3) | TYPE(4) | TYPE(5) | ... |
|---|---|---|---|---|---|---|
| ATTRIBUTE a | | | | | | ... |
| ATTRIBUTE b | | | | | | ... |
| ATTRIBUTE c | | | | | | ... |
| ATTRIBUTE d | △ | □ | ○ | ▱ | ✕ | ... |
| ... | ... | ... | ... | ... | ... | ... |

DISPLAY DEVICE, METHOD FOR CONTROLLING DISPLAY DEVICE, AND DISPLAY SYSTEM

The present application is based on, and claims priority from JP Application Serial Number 2018-201176, filed Oct. 25, 2018, the disclosure of which is hereby incorporated by reference herein in its entirety.

BACKGROUND

1. Technical Field

The present disclosure relates to a display device, a method for controlling a display device, and a display system.

2. Related Art

A display device that accepts an operation by a pointing unit such as a pen tool or user's finger on a display surface such as a screen and performs drawing on the display surface is known. For example, a device described in JP-A-2013-246750 displays a drawing area where a line is drawn along a pen input stroke and a setting area for various settings for pen input, when a graffiti input mode in which the user can make graffiti with a pen is selected. In the setting area, designation frames to designate a type, color, and thickness or the like of a drawn line are prepared. When a designation is made with the pen in each designation frame, a confirmation image is displayed in the drawing area.

However, the device described in JP-A-2013-246750 displays a separate designation frame for each attribute for setting and therefore has a problem in that as the number of attributes that need setting increases, the number of operations increases and this increases the operation load on the user.

SUMMARY

According to an aspect of the present disclosure, a display device includes: a display unit displaying an image on a display surface; a detection unit detecting a position on the display surface pointed by a pointing unit; and a control unit causing the display unit to display an image based on the position detected by the detection unit. The control unit causes the display unit to display a first image and a second image having a different setting of a first attribute and a second attribute from the first image. The control unit decides a setting of the first attribute and the second attribute used for the image based on the position detected by the detection unit, according to an operation on the first image or the second image.

According to another aspect of the present disclosure, a method for controlling a display device which includes a display unit displaying an image on the display surface and a detection unit detecting a position on the display surface pointed by a pointing unit and in which an image based on the position detected by the detection unit is displayed on the display unit, is provided. The method includes: causing the display unit to display a first image and a second image having a different setting of a first attribute and a second attribute from the first image; and deciding a setting of the first attribute and the second attribute used for the image based on the position detected by the detection unit, according to an operation on the first image or the second image.

According to still another aspect of the present disclosure, a display system includes: a display unit displaying an image on a display surface; a detection unit detecting a position on the display surface pointed by a pointing unit; and a control unit causing the display unit to display an image based on the position detected by the detection unit. The control unit causes the display unit to display a first image and a second image having a different setting of a first attribute and a second attribute from the first image. The control unit decides a setting of the first attribute and the second attribute used for the image based on the position detected by the detection unit, according to an operation on the first image or the second image.

DESCRIPTION OF EXEMPLARY EMBODIMENTS

A preferred embodiment of the present disclosure will now be described with reference to the accompanying drawings. In the drawings, the dimension and scale of each part may be appropriately different from reality and may be schematically shown in order to facilitate understanding. The scope of the present disclosure is not limited to the embodiment unless there is any particular description to limit the present disclosure in the following explanation.

1. Outline of Display System

Figure 1:
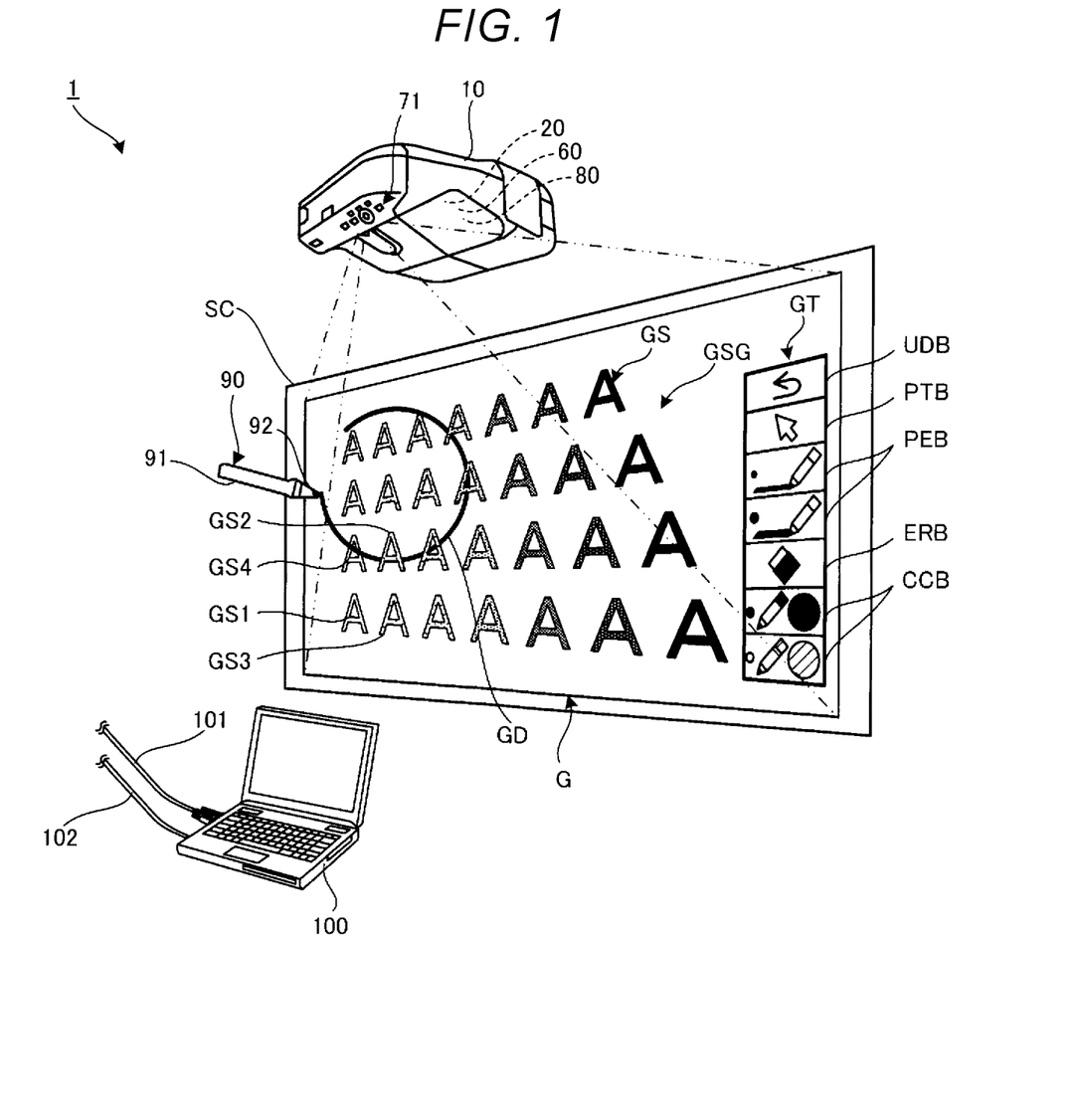
FIG. 1 is a perspective view showing a display system according to an embodiment.

FIG. 1 is a perspective view showing a display system 1 according to an embodiment. The display system 1 is a projection system having a so-called interactive function. As shown in FIG. 1, the display system 1 includes a display device 10, a pointing unit 90, and a PC 100 as an example of an external device.

In the example shown in FIG. 1, the display device 10 is coupled to the PC 100 via cables 101 and 102. Image information DS is inputted to the display device 10 from the PC 100 via the cable 101. The image information DS may be inputted to the display device 10 from the PC 100 via the cable 102. The external device supplying the image information DS to the display device 10 is not limited to the PC 100 and may be, for example, a DVD (digital versatile disk) player or the like. The external device may be wirelessly coupled to the display device 10. In this case, one or both of the cables 101 and 102 may be omitted.

The display device 10 can display an image G based on the image information DS from the PC 100, onto a screen SC. The image G is, for example, an image displayed on the screen of the PC 100, or the like. In the example shown in FIG. 1, the installation site of the screen SC is, for example, a wall. However, this is not limiting. For example, a floor, a table or the like may be employed. The installation site of the display device 10 is, for example, a ceiling. However, this is not limiting. Not only the ceiling but also a wall, a floor, a table, a dedicated installation stand or the like may be employed.

The display device 10 can execute a drawing mode in which an image GD which is a drawn image based on a trajectory of a position on the screen SC pointed by the pointing unit 90 is displayed on the screen SC. Here, the display device 10 detects a position on the screen SC pointed by the pointing unit 90 and displays the image GD based on the position. The image GD may be displayed singly without displaying the image G based on the image information DS, or may be displayed as superimposed on the image G. Also, the display device 10 may display the image G on the screen SC and, in that state, operate the PC 100 similarly to a pointing device such as a mouse according to the position on the screen SC pointed by the pointing unit 90.

The pointing unit 90 is a pen-type device. The pointing unit 90 has a shaft part 91 and a tip button 92 arranged at the tip of the shaft part 91. The tip button 92 is a switch which turns on by being pressed against the screen SC. An infrared light emitting unit, not illustrated, is provided inside the pointing unit 90. The infrared light emitting unit is driven as the tip button 92 turns on. The infrared light emitting unit includes, for example, a light emitting element such as an infrared LED (light-emitting diode), a light emission control circuit, and a power supply. The infrared light emitting unit periodically emits infrared light, for example, by a method conforming to the IrDA (Infrared Data Association) standard. The light emission is detected by the display device 10. The display device 10 detects the position on the screen SC pointed by the pointing unit 90, based on the position of light emission of the pointing unit 90. The shape of the pointing unit 90 is not limited to the pen-type. The pointing unit 90 may also be a human finger or the like.

When in the drawing mode, the display device 10 displays, on the screen SC, a toolbar GT which is a GUI (graphical user interface) image to cause the display device 10 to execute various functions in response to a pointing by the pointing unit 90. The toolbar GT shown in FIG. 1 includes an undo button UDB, a pointer button PTB, a pen button PEB, an eraser button ERB, and a color choice button CCB. The undo button UDB is a button to undo the last operation and return to the previous state. The pointer button PTB is a button to display a mouse pointer used to select an image or the like. The pen button PEB is a button to select a type of the pen used to draw the image GD. The eraser button ERB is a button to select an eraser tool to erase the drawn image GD. The color choice button CCB is a button to select a color of the pen used to draw the image GD.

The case of using the toolbar GT in the form shown in FIG. 1 will now be described as an example. However, the form of the toolbar GT is not limited to the form shown in FIG. 1. The display device 10 may also display, on the screen SC, an image other than the images G, GD and the toolbar GT, for example, an image based on image information stored in the display device 10, or an image based on image information generated by the display device 10, or the like. The display device 10 can be operated, using an operation panel 71 arranged in the main body of the display device 10, and a remote controller, not illustrated in FIG. 1.

For example, when a predetermined operation is carried out on the toolbar GT, the display device 10 displays, on the screen SC, a sample image group GSG used to set an attribute of the image GD. The sample image group GSG illustrated in FIG. 1 includes a plurality of sample images GS having different attributes or different settings of an attribute from each other. Therefore, a sample of a plurality of display forms of the image GD can be presented to the user in the form of the sample image group GSG, without the user having to actually change a setting of an attribute to display the image GD. Each sample image GS can accept an operation by the pointing unit 90. As the user selects and operates one sample image GS from among the plurality of sample images GS, a setting of an attribute of the one sample image GS is reflected on a setting of an attribute of the image GD. Here, the attribute of the one sample image GS includes a first attribute and a second attribute which are different from each other. Therefore, carrying out the operation once can set two attributes of the image GD.

The "attribute" means a characteristic or feature that is visually identifiable to a human. Specific examples may be color, pattern, character, geometric shape, symbol, or the like. The "attribute" is also a concept including a plurality of types belonging to the same characteristic or feature category. For example, when the attribute is color, it is a concept including types such as red, blue, green, and yellow. The "different attributes" means that two attributes in comparison are indifferent categories from each other. The "different settings of an attribute" means different attributes or that two types in comparison, of the same attribute, are different from each other.

2. Configuration of Display Device

Figure 2:
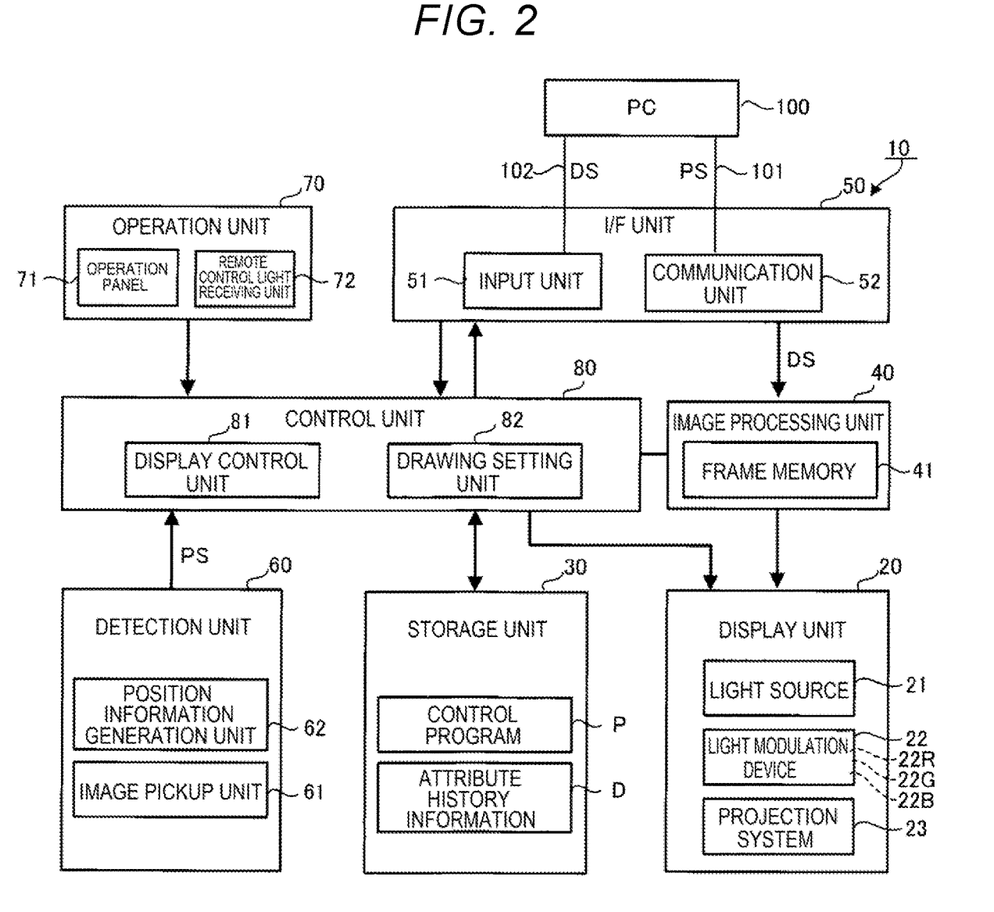
FIG. 2 is a block diagram showing a configuration of a display device according to the embodiment.

FIG. 2 is a block diagram showing the configuration of the display device 10 according to the embodiment. The display device 10 has a display unit 20, a storage unit 30, an image processing unit 40, an I/F (interface) unit 50, a detection unit 60, an operation unit 70, and a control unit 80, as shown in FIG. 2.

The display unit 20 displays an image G on the screen SC, which is a display surface. The display unit 20 has a light source 21, a light modulation device 22, and a projection system 23.

The light source 21 includes, for example, a halogen lamp, xenon lamp, ultra-high-pressure mercury lamp, LED (light-emitting diode), or laser light source or the like. The light source 21 emits, for example, each of red light, green light, and blue light, or emits white light. When the light source 21 emits white light, the light emitted from the light source 21 is reduced in unevenness in luminance distribution by an optical integration system, not illustrated, and is subsequently separated into red light, green light, and blue light by a color separation system, not illustrated, and becomes incident on the light modulation device 22. The light modulation device 22 includes light modulation elements 22R, 22G, and 22B provided corresponding to the red light, green light, and blue light. Each of the light modulation elements 22R, 22G, and 22B includes, for example, a transmission-type liquid crystal panel, reflection-type liquid crystal panel, or DMD (digital mirror device) or the like. The light modulation elements 22R, 22G, and 22B modulate the red light, green light, and blue light, respectively, and generate image light of the respective colors. The image light of the respective colors generated by the light modulation device 22 is combined together into full-color image light by a light combining system, not illustrated. The projection system 23 projects the full-color image light to form an image on the screen SC. The projection system 23 is an optical system including at least one projection lens and may include a zoom lens or a focus lens or the like.

The storage unit 30 is formed of, for example, a hard disk drive or semiconductor memory. The storage unit 30 stores a control program P executed by the control unit 80 and data including attribute history information D processed by the control unit 80. The control program P and the attribute history information D will be described in detail later. The storage unit 30 may also be provided in a storage device outside the display device 10 or in a server or the like.

The image processing unit 40 has a frame memory 41. The image processing unit 40 loads the image information DS from the I/F unit 50 into the frame memory 41, executes various kinds of processing such as resolution conversion, resizing, and distortion correction according to need, and inputs the result to the display unit 20. The image processing unit 40 executes processing based on a signal from the control unit 80, according to need, for example, processing to cause the display unit 20 to display the image GD and the toolbar GT or the like.

The I/F unit 50 has an input unit 51 and a communication unit 52, as an interface that can be coupled to an external device such as the PC 100. The I/F unit 50 may be arranged in the same casing as the main body of the display device 10 or may be arranged in a different casing from the casing of the main body of the display device 10.

The input unit 51 can take an input of the image information DS from the PC 100. Specifically, the input unit 51 is, for example, a D-sub or HDMI interface or the like. A plurality of input units 51 may be provided, and in such a case, the same standard or different standards may be used. The input unit 51 may be wirelessly connected to an external device, for example, via Wi-Fi or Bluetooth or the like, or may be connected to an external device via a LAN (local area network) or the internet or the like. HDMI, Wi-Fi, and Bluetooth are trademarks registered.

The communication unit 52 can be coupled to the PC 100 in such a way as to be able to communicate. Specifically, the communication unit 52 is, for example, a USB interface or the like. A plurality of communication units 52 may be provided, and in such a case, the same standard or different standards from each other may be used.

The detection unit 60 detects a position on the screen SC pointed by the pointing unit 90 and generates position information PS representing the position. The detection unit 60 has an image pickup unit 61 and a position information generation unit 62. The image pickup unit 61 picks up an image of the screen SC. The image pickup unit 61 includes an image pickup element such as a CCD (charge-coupled device) image sensor or CMOS (complementary MOS) image sensor. The position information generation unit 62 generates the position information PS about the position on the screen SC pointed by the pointing unit 90. Specifically, the position information generation unit 62 generates the position information PS based on an output signal from the image pickup unit 61. The position pointed by the pointing unit 90 is represented, for example, by coordinates on a coordinate system set on the screen SC. The position information PS includes information representing the coordinates. The detection unit 60 is not limited to a configuration using an image pickup element as described above, provided that the detection unit 60 can detect a position on the screen SC pointed by the pointing unit 90. For example, the detection unit 60 may have a configuration using a laser light source and a light receiving element.

The operation unit 70 has an operation panel 71 and a remote control light receiving unit 72. The operation panel 71 is provided at an outer casing of the display device 10 and is configured to be able to accept an operation by the user. The operation panel 71 outputs a signal based on an operation by the user. The remote control light receiving unit 72 receives an infrared signal from a remote controller, not illustrated, decodes the infrared signal, and outputs a signal based on an operation on the remote controller.

The control unit 80 has a function of controlling each part of the display device 10 and a function of processing various data. The control unit 80 includes, for example, a CPU (central processing unit) or the like. The control unit 80 executes the control program P stored in the storage unit 30 and thus implements various functions including functional units described below. The control unit 80 may be formed of a single processor or a plurality of processors. A part or all of the functions of the control unit 80 may be implemented by hardware such as a DSP (digital signal processor), ASIC (application-specific integrated circuit), PLD (programmable logic device), or FPGA (field-programmable gate array).

The control unit 80 has a display control unit 81 and a drawing setting unit 82, as functional units. The display control unit 81 executes processing about the display by the display unit 20. More specifically, for example, the display control unit 81 has a function of causing the display unit 20 to display the image GD based on the position information PS, which is the result of detection by the detection unit 60, and causing the display unit 20 to display the image G based on the image information DS from the PC 100. The display control unit 81 also has a sample function to display the sample image group GSG as a sample of a plurality of display forms having different attributes of the image GD. For the display control unit 81, whether to use the sample function or not can be set. The drawing setting unit 82 executes processing about a setting of an attribute of the image GD. More specifically, for example, the drawing setting unit 82 decides a setting of an attribute used for the image GD, in response to an operation on the toolbar GT or the sample image group GSG, and stores, in the storage unit 30, information about the result of use of the setting as the attribute history information D. The attribute history information D may be any history information about the attribute of the image GD and may be of any format.

Figure 3:
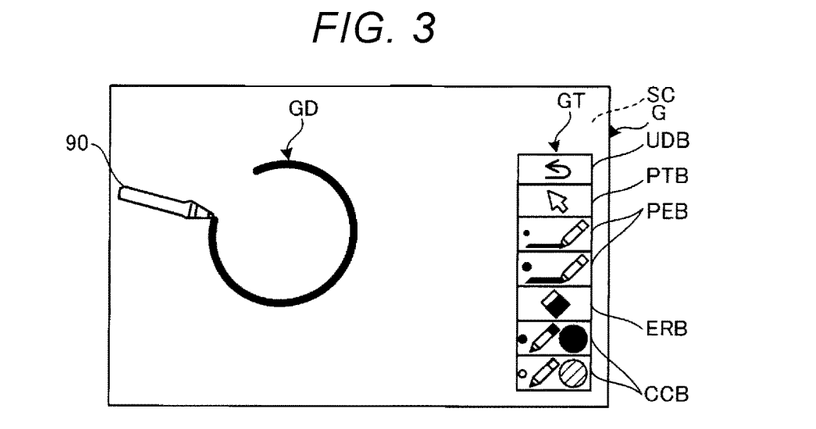
FIG. 3 illustrates a display shown when a drawing mode is executed.

FIG. 3 illustrates a display shown when the drawing mode is executed. When the drawing mode is executed, the image GD, which is a drawn image based on a trajectory of a position on the screen SC pointed by the pointing unit 90, is displayed, as shown in FIG. 3. At this time, the toolbar GT is displayed on the screen SC, as described above.

Figure 4:
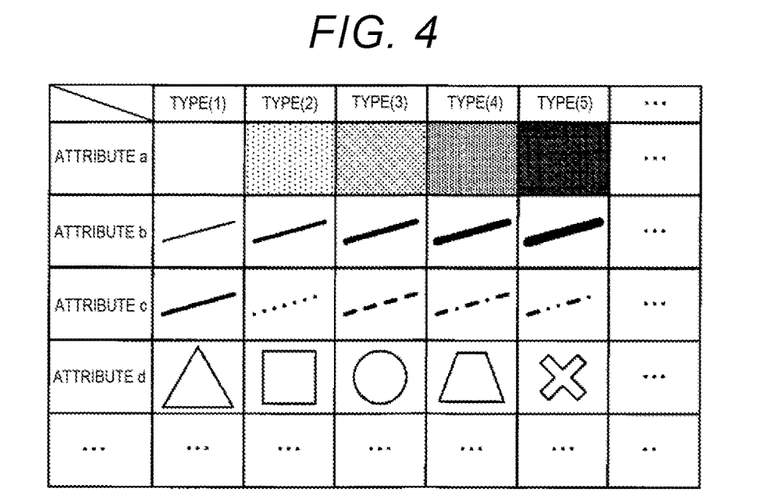
FIG. 4 illustrates an attribute used for drawing.

FIG. 4 illustrates attributes used for drawing. The display device 10 can set attributes a, b, c, and d, illustrated in FIG. 4, as attributes of the image GD. Each of the attributes a, b, c, and d includes different types (1) to (5) from each other.

Specifically, the attribute a is color and includes different colors from each other as the types (1) to (5). The "different colors" means that two colors in comparison are different from each other in one or some of hue, saturation, and brightness. In FIG. 4, for the sake of convenience of the description, the types (1) to (5) of the attribute a, which is, color, are expressed by different shades of gray from each other on a grayscale. The attribute b is thickness and includes different thicknesses from each other as the types (1) to (5). In the example of the attribute b shown in FIG. 4, thickness increases in order from the type (1) to the type (5). The attribute c is line type and includes different line types from each other as the types (1) to (5). In the example of the attribute c shown in FIG. 4, the type (1) is solid line, the type (2) is dotted line, the type (3) is dashed line, the type (4) is dash-dotted line, and the type (5) is dash-double-dotted line. The attribute d is geometric shape and includes different geometric shapes from each other as the types (1) to (5). In the example of the attribute d shown in FIG. 4, the type (1) is triangle, the type (2) is quadrilateral, the type (3) is circle, the type (4) is trapezoid, and the type (5) is diagonal cross.

The attributes and their types shown in FIG. 4 are an example. The attributes and their types used for the image GD or the sample image GS are not limited to the example shown in FIG. 4.

Figure 5:
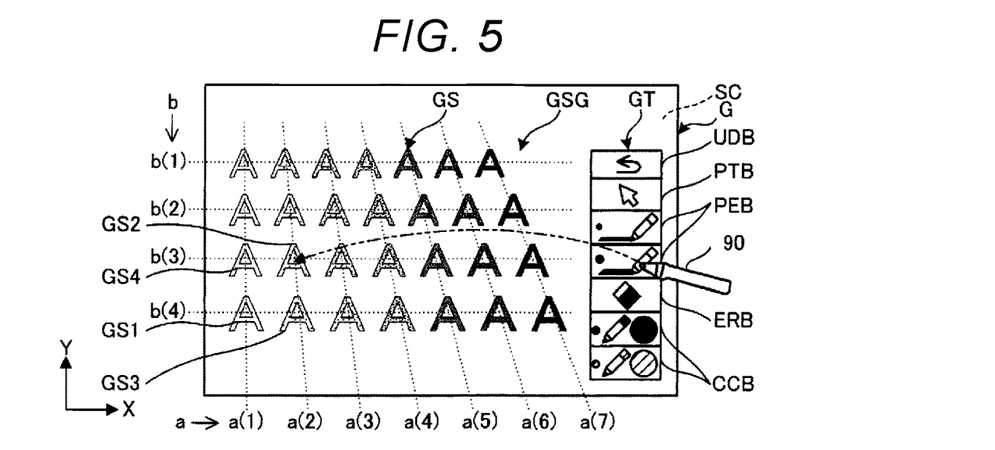
FIG. 5 illustrates a sample display.

FIGS. 5 to 9 illustrate a sample display. When the drawing mode is executed, a predetermined operation on the toolbar GT displays a sample image group GSG including a plurality of sample images GS having different attributes from each other, for example, as shown in FIG. 5. In the description below, the left-right directions or the directions of width of the screen SC are referred to as an X-axis, and the up-down directions or the directions of height are referred to as a Y-axis, as shown in FIGS. 5 to 9. The right-hand side in the illustration is the positive side on the X-axis. The left-hand side is the negative side on the X-axis. The top side in the illustration is the positive side on the Y-axis. The bottom side is the negative side on the Y-axis.

FIG. 5 illustrates the case where each sample image GS is an image showing the letter "A" and where the attributes a and b are used as the attributes of the image. The attributes a and b are an example of the first attribute and the second attribute that are different from each other. Each sample image GS can accept an operation by the user, via a pointing or the like by the pointing unit 90. As this operation is carried out, an attribute of the sample image GS selected by the operation is set as an attribute of the image GD.

The plurality of sample images GS illustrated in FIG. 5 are arranged into a matrix made up of columns a(1), a(2), a(3), a(4), a(5), a(6), and a(7) laid out along the X-axis and rows b(1), b(2), b(3), and b(4) laid out along the Y-axis. The columns a(1), a(2), a(3), a(4), a(5), a(6), and a(7) represent different types of the attribute a from each other. For example, a plurality of types of the attribute a illustrated in FIG. 4 are allocated to the columns a(1), a(2), a(3), a(4), a(5), a(6), and a(7). This allocation may be preset or may be set based on the attribute history information D. Meanwhile, the rows b(1), b(2), b(3), and b(4) represent different types of the attribute b from each other. For example, a plurality of types of the attribute b illustrated in FIG. 4 are allocated to the rows b(1), b(2), b(3), and b(4). This allocation may be preset or may be set based on the attribute history information D.

The numbers of columns and rows of the plurality of sample images GS forming the sample image group GSG are not limited to the numbers illustrated in FIG. 5. The arrangement of the plurality of sample images GS is not limited to the arrangement shown in FIG. 5, either. For example, the interval between the columns a(1), a(2), a(3), a(4), a(5), a(6), and a(7) shown in FIG. 5 is not constant but it may be constant. Also, the relationship between the attribute in the columns and the attribute in the rows may be reversed. The direction in which the rows or the columns extend may tilt in relation to the X-axis or the Y-axis.

The plurality of sample images GS include a first image GS1 and a second image GS2, which are two sample images GS having different settings from each other, of each of the attributes a and b. The first image GS1 is an arbitrary sample image GS, of the plurality of sample images GS. The second image GS2 is an arbitrary sample image GS having a different type of each of the attributes a and b from the first image GS1, of the plurality of sample images GS. FIG. 5 shows, as an example, the case where the sample image GS belonging to the column a(1) and the row b(4) is the first image GS1 and where the sample image GS belonging to the column a(2) and the row b(3) is the second image GS2.

The plurality of sample images GS also includes a third image GS3 and a fourth image GS4 having a different setting of the attribute a or b from the first image GS1 and the second image GS2 and having different settings from each other, of the attributes a and b. The third image GS3 is an arbitrary sample image GS having a different setting of the attribute a or b from the first image GS1 and the second image GS2, of the plurality of sample images GS. The fourth image GS4 is an arbitrary sample image GS having a different setting of the attribute a or b from the first image GS1 and the second image GS2 and having a different type of each of the attribute a and b from the third image GS3, of the plurality of sample images GS. FIG. 5 shows, as an example, the case where the sample image GS belonging to the column a(2) and the row b(4) is the third image GS3 and where the sample image GS belonging to the column a(1) and the row b(3) is the fourth image GS4.

Figure 6:
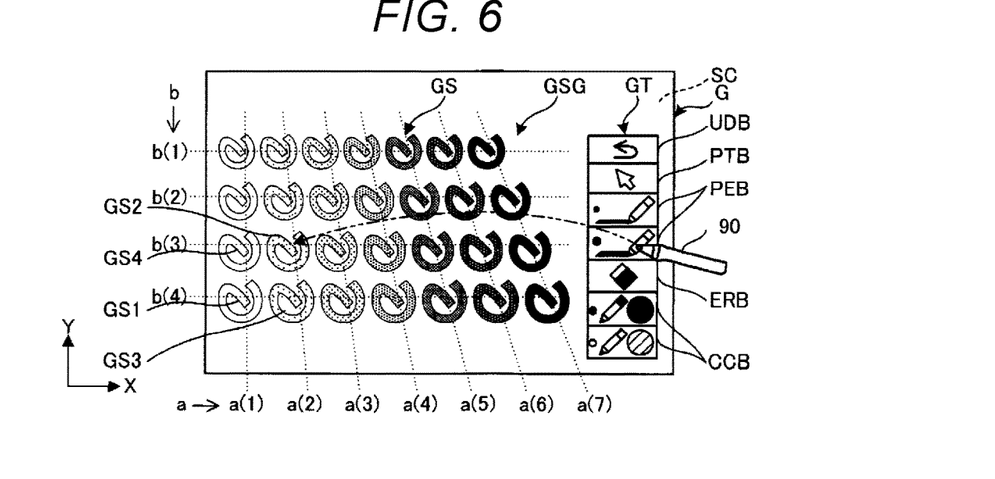
FIG. 6 illustrates a sample display.

Although FIG. 5 illustrates the case where each sample image GS is an image showing the letter "A", this is not limiting. Each sample image GS may be, for example, a line drawing as shown in FIG. 6 or may be a geometric shape of the attribute d illustrated in FIG. 4.

The sample image group GSG may be displayed singly without displaying the image G based on the image information DS or may be displayed as superimposed on the image G. However, when the image GD is displayed as superimposed on the image G, it is preferable that the sample image group GSG, too, is displayed as superimposed on the image G. In this case, the visibility or the like of the image GD when superimposed on the image G can be presented to the user in the form of the sample image group GSG.

Figure 7:
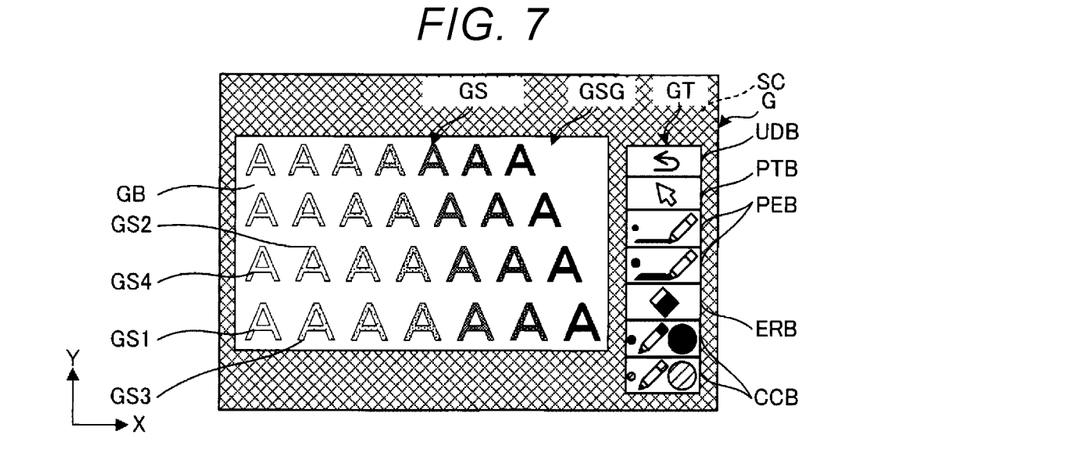
FIG. 7 illustrates a sample display.
Figure 8:
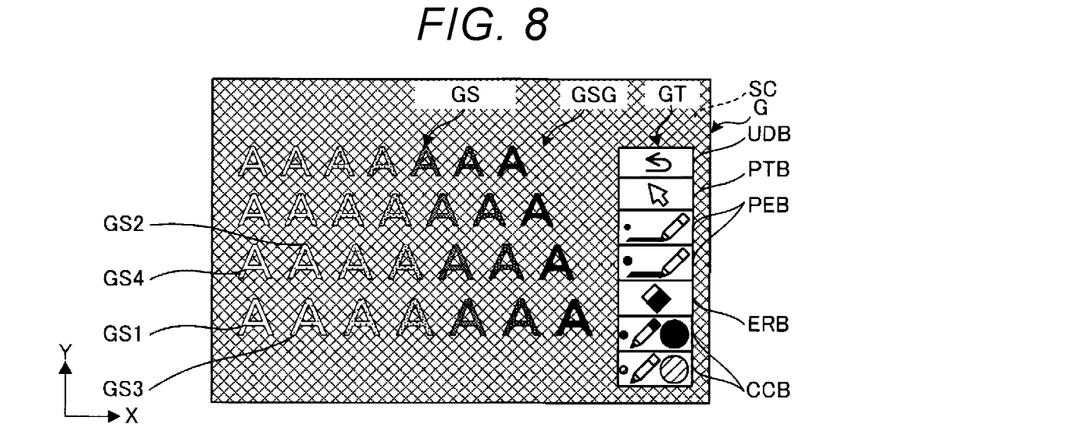
FIG. 8 illustrates a sample display.
Figure 9:
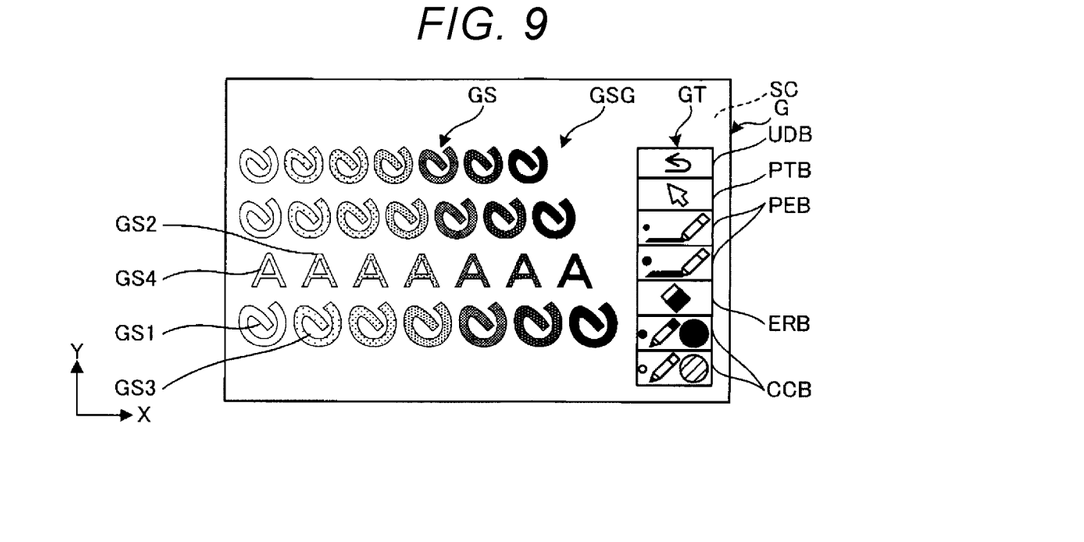
FIG. 9 illustrates a sample display.

As shown in FIG. 7, the sample image group GSG may be displayed as superimposed on a background image GB that is different from the image G. In this case, the attributes of the sample image group GSG are more visible to the user. Therefore, the user can more easily make a determination when confirming or changing a setting or the like of the sample image group GSG. For example, when the sample image group GSG displayed as superimposed on the image G is not so visible, as shown in FIG. 8, using the background image GB is effective. The background image GB is not particularly limited but may be preferably an image that affects the visibility of the sample image group GSG as little as possible. Specifically, for example, a uniform image such as a white image is preferable. Also, the background image GB may be switched between show and hide, for example, in response to an operation by the user or the like, or may be displayed at a proper time by setting a display period immediately after starting the display of the sample image group GSG.

The sample images GS in one or a plurality of rows or columns may be images having a different shape from the sample images GS in the other rows or columns. In an example shown in FIG. 9, the shape of the sample images GS in one row is different from the shape of the sample images GS in the other rows. For example, an attribute of the sample images GS in the one row is set based on the attribute history information D. This is advantageous in that the difference between the setting of the attribute of the sample images GS in the one row and the setting of the attribute of the sample images GS in the other rows is easy to understand for the user.

Figure 10:
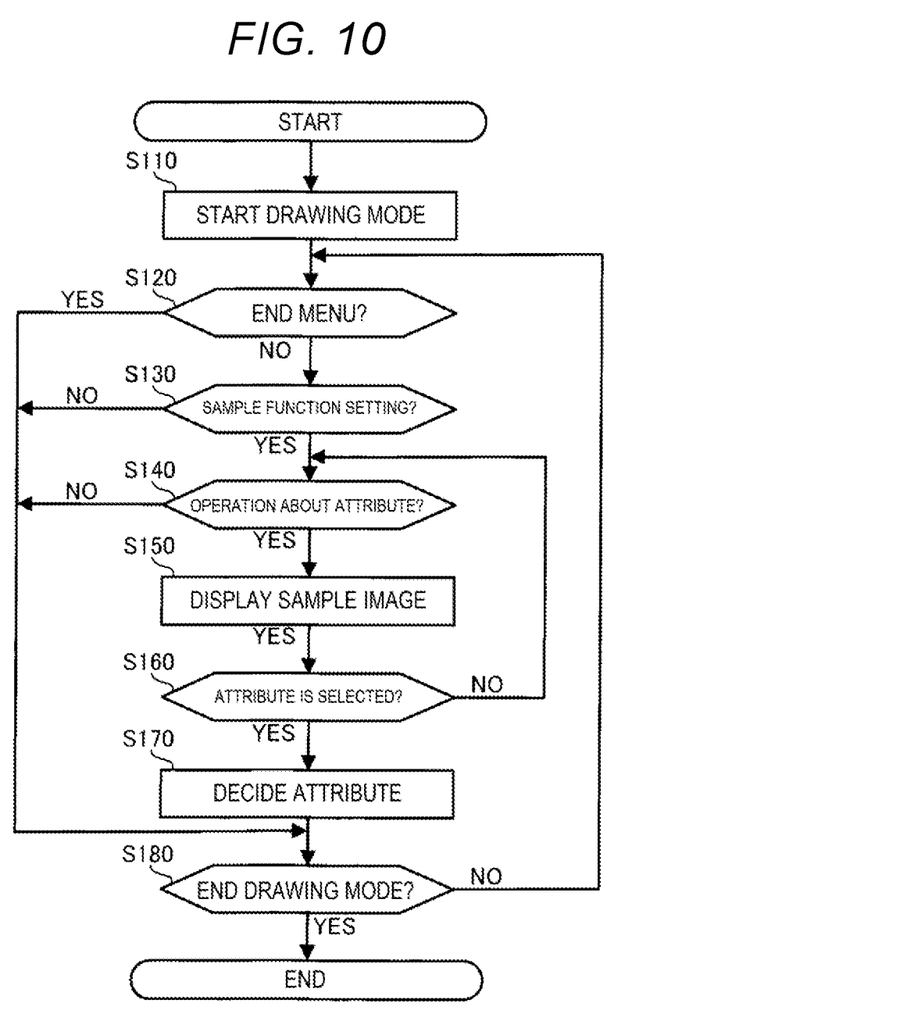
FIG. 10 is a flowchart showing an example of an operation carried out when the display device executes the drawing mode.

FIG. 10 is a flowchart showing an example of an operation carried out when the display device 10 executes the drawing mode. As the display device 10 receives an instruction to execute the drawing mode, first, the control unit 80 starts the drawing mode in step S110, as shown in FIG. 10. Specifically, in step S110, the control unit 80 causes the display unit 20 to display the toolbar GT as a menu and thus creates a state where the image GD based on the result of detection by the detection unit 60 can be displayed.

Next, in step S120, the control unit 80 determines whether an instruction to end the display of the toolbar GT as a menu is given or not. When the instruction to end the display of the menu is not given in step S120, the control unit 80 in step S130 determines whether or not it is the state where a sample function, which is a function about the sample image group GSG, is set. When it is the state where the sample function is set in step S130, the control unit 80 in step S140 determines whether an operation about an attribute of the image GD is carried out on the toolbar GT or not.

When the operation about an attribute is carried out in step S140, the control unit 80 causes the display unit 20 to display the sample image group GSG. At this time, a setting of an attribute used for the sample image group GSG is decided according to the type of the operation on the toolbar GT. For example, when the operation on the toolbar GT is an operation about color, color is set as the first attribute used for the sample image group GSG. In this case, the second attribute used for the sample image group GSG may be any attribute other than color, for example, thickness. Similarly, when the operation on the toolbar GT is an operation about line type, line type is set as the first attribute used for the sample image group GSG. When the operation on the toolbar GT is an operation about geometric shape, geometric shape is set as the first attribute used for the sample image group GSG.

Subsequently, in step S160, the control unit 80 determines whether an attribute is selected by an operation on the sample image group GSG or not. When no attribute is selected in step S160, the control unit 80 returns to step S140. Meanwhile, when an attribute is selected in step S160, the control unit 80 in step S170 decides the attribute according to this selection, as an attribute used for the image GD. At this time, the control unit 80 causes the storage unit 30 to store the attribute history information D reflecting the result of the decision.

Subsequently, the control unit 80 shifts to step S180. Also, when the instruction to end the display of the menu is given in step S120, when it is not the state where the sample function is set in step S130, or when the operation about an attribute is not carried out in step S140, the control unit 80 shifts to step S180. In step S180, the control unit 80 determines whether an instruction to end the drawing mode is given or not. When the instruction is not given, the control unit 80 returns to step S120. Meanwhile, when the instruction is given, the control unit 80 ends the drawing mode.

The display system 1 or the display device 10 includes: the display unit 20 displaying an image G on the screen SC as a display surface; the detection unit 60 detecting a position on the screen SC pointed by the pointing unit 90; and the control unit 80 causing the display unit 20 to display an image GD based on the position detected by the detection unit 60, as described above. The control unit 80 causes the display unit 20 to display a first image GS1 and a second image GS2 having a different setting of a first attribute and a second attribute from the first image GS1. The control unit 80 decides a setting of the first attribute and the second attribute used for the image GD based on the position detected by the detection unit 60, according to an operation on the first image GS1 or the second image GS2.

The method for controlling the display device 10 includes causing the display unit 20 to display a first image GS1 and a second image GS2 having a different setting of a first attribute and a second attribute from the first image GS1; and deciding a setting of the first attribute and the second attribute used for the image GD based on the position detected by the detection unit 60, according to an operation on the first image GS1 or the second image GS2.

According to the display system 1, the display device 10, and the control method for the display device as described above, the setting of the first attribute and the second attribute used for the image GD based on the position detected by the detection unit 60 can be decided by one operation on the first image GS1 or the second image GS2. Therefore, compared with the case where the number of attributes allocated to an image for the operation is one per image, the number of the operations is smaller and therefore the operation load on the user can be reduced. As the first image GS1 and the second image GS2 are displayed, the visibility or the like of the image GD based on the difference in the setting of the first attribute and the second attribute can be presented simultaneously to the user, without actually changing a setting of an attribute of the image GD. Based on this presentation, the setting of the first attribute and the second attribute used for the image GD is decided. This enables a setting of an attribute that meets the user's wish for the image GD.

The first attribute or the second attribute used for the first image GS1 and the second image GS2 may be color, thickness, or line type, for example, the above attribute a, b, or c. Color, thickness, or line type is suitable for drawing and is therefore suitable as an attribute used for the image GD. Also, color, thickness, or line type tends to influence the visibility or the like of the image GD. Therefore, when the first attribute or the second attribute is color, thickness, or line type, it is advantageous in that the visibility or the like of the image GD is easy to adjust.

The first attribute may be color and the second attribute may be thickness. Color and thickness can provide a greater number of different types in terms of visibility or the like of the image GD than other attributes such as line type. Therefore, when the first attribute is color and the second attribute is thickness, a broader range of adjustment can be provided in terms of the visibility or the like of the image GD than when other attributes are used. Thus, for example, when the image GD is displayed as superimposed on the image G, an attribute of the image GD can be properly set with respect to various forms of the image G.

Also, the first attribute may be shape and the second attribute may be color, thickness, or line type. In this case, the first image GS1 and the second image GS2 corresponding to a shape drawn by the user can be displayed with different settings of the attribute of color, thickness, or line type.

In the embodiment, the control unit 80 causes the display unit 20 to display the first image GS1 and the second image GS2 as superimposed on the image G based on the image information DS from the PC 100, which is an example of an external device. When the image GD is displayed as superimposed on the image G, the image GD may become less visible, depending on the form of the image G. Therefore, superimposing the first image GS1 and the second image GS2 on the image G is useful when displaying the image GD as superimposed on the image G.

The display device 10 has the storage unit 30 storing the attribute history information D, which is history information about an attribute of the image GD based on the position detected by the detection unit 60. The control unit 80 decides a setting of the first attribute or the second attribute used for the first image GS1 or the second image GS2, based on the attribute history information D. Therefore, the first image GS1 and the second image GS2 can be displayed, using a setting of an attribute that the user is highly likely to use. Thus, compared with a case where an attribute of the first image GS1 and the second image GS2 is set without using the attribute history information D, other operations for changing the setting of the attribute used for the first image GS1 and the second image GS2 can be reduced.

The control unit 80 also causes the display unit 20 to display the toolbar GT as an operation image that can accept an operation about the display of the image GD based on the position detected by the detection unit 60. The control unit 80 then causes the display unit 20 to display the first image GS1 and the second image GS2, based on an operation on the toolbar GT, more specifically, based on an operation on the pen button PEB or the color choice button CCB. Therefore, the first image GS1 and the second image GS2 can be automatically displayed when needed, with an operation about the display of the image GD based on the position detected by the detection unit 60. The phrase "when needed" specifically refers to, for example, when the user intends to start drawing the image GD or change an attribute used for the image GD, by carrying out an operation on the pen button PEB or the color choice button CCB.

In the embodiment, the control unit 80 causes the display unit 20 to display the third image GS3 and the fourth image GS4. The third image GS3 has a different setting of one or both of the first attribute and the second attribute from both of the first image GS1 and the second image GS2. The fourth image GS4 has a different setting of one or both of the first attribute and the second attribute from all of the first image GS1, the second image GS2, and the third image GS3. The control unit 80 decides a setting of the first attribute and the second attribute used for the image GD based on the position detected by the detection unit 60, according to an operation on the third image GS3 or the fourth image GS4. In this configuration, the number of display forms presented as a sample of the image GD is larger than when the third image GS3 and the fourth image GS4 are not displayed. Therefore, the user can more easily make a determination about an attribute that meets the user's wish for the image GD.

The setting of the first attribute of the third image GS3 may be preferably the same as that of the second image GS2. In this case, the visibility of the image GD based on the difference in the setting of the second attribute can be easily evaluated by a visual comparison between the second image GS2 and the third image GS3. Similarly, the setting of the first attribute of the fourth image GS4 may be preferably the same as that of the first image GS1. In this case, the visibility of the image GD based on the difference in the setting of the second attribute can be easily evaluated by a visual comparison between the first image GS1 and the fourth image GS4. Also, the setting of the second attribute of the third image GS3 may be preferably the same as that of the first image GS1. In this case, the clear visibility of the image GD based on the difference in the setting of the first attribute can be easily evaluated by a visual comparison between the first image GS1 and the third image GS3. The setting of the second attribute of the fourth image GS4 may be preferably the same as that of the second image GS2. In this case, the clear visibility of the image GD based on the difference in the setting of the first attribute can be easily evaluated by a visual comparison between the second image GS2 and the fourth image GS4.

The first image GS1, the second image GS2, the third image GS3, and the fourth image GS4 are laid out on the screen SC. The first image GS1 and the third image GS3 may be preferably laid out along the direction in which the second image GS2 and the fourth image GS4 are laid out. In this case, when evaluating the visibility of the image GD based on the difference in the setting of the first attribute, it is easy to visually compare the first image GS1 and the third image GS3 or visually compare the second image GS2 and the fourth image GS4.

3. Modification Example

The display device and the display system according to the present disclosure have been described above, based on the illustrated embodiment. However, the present disclosure is not limited to this. The configuration of each part of the present disclosure can be replaced by an arbitrary configuration that achieves a function similar to that in the foregoing embodiment. Also, an arbitrary configuration can be added. Moreover, the present disclosure may include a combination of arbitrary configurations in the embodiment.

In the above embodiment, a configuration where the sample image group GSG is displayed in response to an operation on the pen button PEB or the color choice button CCB is described as an example. However, this configuration is not limiting. The sample image group GSG may be displayed, for example, in response to an operation on another button in the toolbar GT or a button other than the toolbar GT, or may be displayed in response to the start of execution of the drawing mode.

In the above embodiment, the case where the display device 10 is a projector is described as an example. However, the display device according to the present disclosure is not limited to a projector and may be, for example, a touch panel-type display device.

What is claimed is:
1. A display device comprising:
a display unit displaying an image on a display surface;
a detection unit detecting a position on the display surface pointed by a pointing unit; and
a control unit causing the display unit to display an image based on the position detected by the detection unit, wherein
the control unit
causes the display unit to display a first image and a second image having a different setting of a first attribute and a second attribute from the first image,
decides a setting of the first attribute and the second attribute used for the image based on the position detected by the detection unit, according to an operation on at least one of the first image and the second image,
causes the display unit to display a third image having a different setting of at least one of the first attribute and the second attribute from both of the first image and the second image, and a fourth image having a different setting of at least one of the first attribute and the second attribute from all of the first image, the second image, and the third image, and
decides a setting of the first attribute and the second attribute used for the image based on the position detected by the detection unit, according to an operation on the third image or the fourth image.

2. The display device according to claim 1, wherein the first attribute or the second attribute is color, thickness, or line type.

3. The display device according to claim 2, wherein the first attribute is color, and
the second attribute is thickness.

4. The display device according to claim 2, wherein the first attribute is shape, and
the second attribute is color, thickness, or line type.

5. The display device according to claim 1, wherein the control unit causes the display unit to display the first image and the second image as superimposed on an image based on image information from an external device.

6. The display device according to claim 1, further comprising
a storage unit storing history information about an attribute of the image based on the position detected by the detection unit, wherein
the control unit decides a setting of the first attribute or the second attribute used for the first image or the second image, based on the history information.

7. The display device according to claim 1, wherein the control unit
causes the display unit to display an operation image configured to accept an operation about the display of the image based on the position detected by the detection unit, and
causes the display unit to display the first image and the second image, based on an operation on the operation image.

8. The display device according to claim 1, wherein the setting of the first attribute of the third image is the same as that of the second image,
the setting of the second attribute of the third image is the same as that of the first image,
the setting of the first attribute of the fourth image is the same as that of the first image, and
the setting of the second attribute of the fourth image is the same as that of the second image.

9. The display device according to claim 7, wherein the first image, the second image, the third image, and the fourth image are laid out on the display surface, and
the first image and the third image are laid out in a direction in which the second image and the fourth image are laid out.

10. A method for controlling a display device which includes a display unit displaying an image on a display surface and a detection unit detecting a position on the display surface pointed by a pointing unit and in which an image based on the position detected by the detection unit is displayed on the display unit, the method comprising:
causing the display unit to display a first image and a second image having a different setting of a first attribute and a second attribute from the first image;
deciding a setting of the first attribute and the second attribute used for the image based on the position detected by the detection unit, according to an operation on at least one of the first image and the second image;
causing the display unit to display a third image having a different setting of at least one of the first attribute and the second attribute from both of the first image and the second image, and a fourth image having a different setting of at least one of the first attribute and the second attribute from all of the first image, the second image, and the third image, and
deciding a setting of the first attribute and the second attribute used for the image based on the position detected by the detection unit, according to an operation on the third image or the fourth image.

11. A display system comprising:
a display unit displaying an image on a display surface;
a detection unit detecting a position on the display surface pointed by a pointing unit; and
a control unit causing the display unit to display an image based on the position detected by the detection unit, wherein
the control unit
causes the display unit to display a first image and a second image having a different setting of a first attribute and a second attribute from the first image,
decides a setting of the first attribute and the second attribute used for the image based on the position detected by the detection unit, according to an operation on at least one of the first image and the second image,
causes the display unit to display a third image having a different setting of at least one of the first attribute and the second attribute from both of the first image and the second image, and a fourth image having a different setting of at least one of the first attribute and the second attribute from all of the first image, the second image, and the third image, and
decides a setting of the first attribute and the second attribute used for the image based on the position detected by the detection unit, according to an operation on the third image or the fourth image.

12. The display device according to claim 1, wherein the first image and the second image are displayed side-by-side on the display surface.

\* \* \* \* \*